United States Patent Office 2,899,278
Patented Aug. 11, 1959

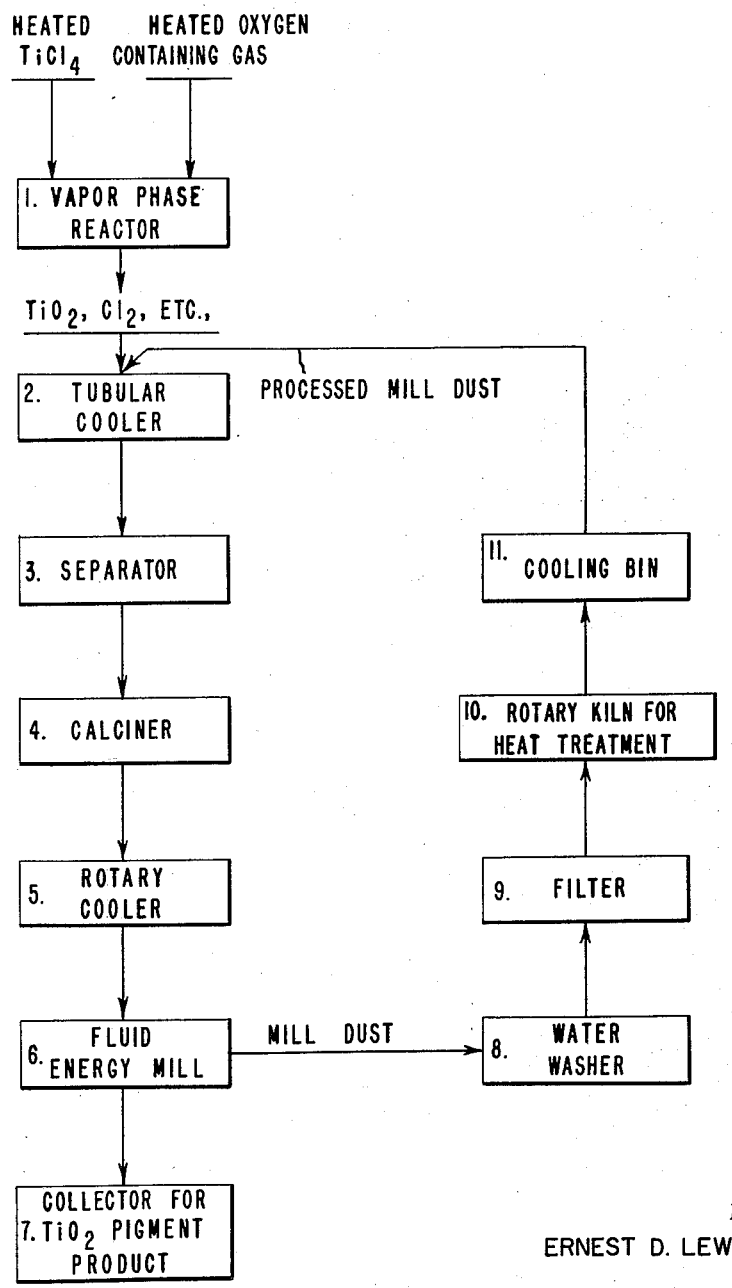

2,899,278
PIGMENT PRODUCTION

Ernest D. Lewis, Swarthmore, Pa., assignor to E. I. du Pont de Nemours and Company, Wilmington, Del., a corporation of Delaware Application December 21, 1956, Serial No. 629,852

5 Claims. (Cl. 23—202)

This invention relates to the production of titanium dioxide pigment by the vapor phase oxidation of $TiCl_4$, and more particularly to cooling the mixture of pigment and gases exited from the oxidation reactor.

In one of the more recently developed methods for producing titanium dioxide pigment, which is described in U.S. Patent 2,488,439, vaporized and preheated titanium tetrachloride is fed to a high temperature reaction zone where it is mixed with oxygen or oxygen-containing gases. The oxygen and the titanium tetrachloride react to form chlorine and solid particles of titanium dioxide, and the latter is carried from the reaction zone in a mixture of chlorine and residual gases. This exiting suspension is usually at temperatures considerably in excess of 1000° C., and because of this high temperature and the corrosive nature of the gases present, it is necessary to cool the suspension before separating the pigment from the gases. One method of cooling consists of passing the hot, gas-containing reaction products through a heat exchanger which is in effect a long conduit or pipe having cooled walls. For reasons of space, economy, and sturdy construction, this pipe is usually set up as a plurality of vertical components connected in series by U bends. It is fabricated from any suitable metal which has good thermal conductivity and resistance to corrosion, such as nickel or aluminum, and it is liquid-cooled. Water seems to be the most effective and available cooling medium for use in this heat exchange unit, and it is usually passed through a jacket which surrounds the conduit. The wall of the metal conduit serves as a heat transfer surface, and efficient cooling is dependent upon keeping its interior free of titanium dioxide deposits in the form of a scale-like build-up or coating which tend to form thereon. Such deposits are poor heat conductors, and they can seriously interfere with the heat transfer. A method for removing titanium dioxide scale from this type of cooling apparatus is disclosed in U.S. Patent 2,721,626 to C. E. Rick. This method comprises admixing abrasive materials, such as sand, with the stream of titanium dioxide and reaction product gases. On passing through the cooling conduit with the rest of the stream these abrasives exert a scouring or scrubbing action which removes adhering titanium dioxide. One of the preferred abrasive materials for Rick's process is calcined titanium dioxide. This material is readily available since calcination is one of the steps in the production of titanium dioxide pigment. However, the use of this calcined material necessitates directing back to the cooling conduit material which would otherwise be processed to the pigment product and therefore decreases the overall capacity of the system.

The present invention makes use of a by-product titanium dioxide dust that results when titanium dioxide is subjected to fluid energy milling. Fluid energy milling is a conventional step in the production of titanium dioxide to reduce the material to pigment particle size, and it is accompanied by the production of fine waste dust which separates and is therefore lost from the bulk of the pigment product. The dust itself, of course, is too fine to be of any utility as an abrading solid. However, it has been found that if this dust is water-washed, collected, and heat treated, it is an excellent material for keeping the cooling conduit free of adhering titanium dioxide deposits. This is quite surprising in view of the fineness of the original particles. Additionally, it has been found that this material may be used in smaller amounts than prior art abrading solids, thus increasing the cooling conduit's capacity for the hot materials from the oxidation reactor. It has been further found that the pigment produced in accordance with this invention is superior to that produced in similar processes using prior art abrading solids.

The objects of this invention are accomplished by a process for cooling the reaction product gases—titanium dioxide stream resulting from the vapor phase oxidation of $TiCl_4$ to $TiO_2$. This process comprises passing the stream through an externally cooled conduit while removing titanium dioxide adhering to the inner wall of the conduit by adding to the stream, in an amount sufficient to scour the walls, titanium dioxide granules obtained by water-washing, collecting, and heat treating at 500° C.–900° C. titanium dioxide dust from a fluid energy mill, used for grinding the $TiO_2$ product produced in a vapor phase oxidation of $TiCl_4$. The titanium dioxide exited from the cooling conduit is then separated from the exited gaseous products and cooled titanium dioxide is recovered.

As has been previously mentioned, fluid energy milling is conventional in the production of titanium dioxide, and one skilled in the art is familiar with the dust produced in such an operation. A fluid energy mill is essentially a means for grinding material to a fine particle size. The mill is comprised of a shallow cylindrical chamber having a concentric, cylindrical, open-ended conduit of substantially smaller diameter extending upwardly and into the chamber along its vertical axis. The material to be pulverized is introduced from an aperture at the top and near the chamber's outer periphery. Dry gas or steam under pressure is introduced at a number of points along the periphery in such a direction as to set up a high velocity gaseous vortex which classifies and reduces the particle size of solids which are introduced into the chamber. The spent gases and the material which has been reduced in particle size are carried into the central conduit as a result of the centripetal force created by the vortex, whereupon the product fines are separated from the spent gases in a centrifugal separator situated below the conduit. The finest solid fraction or dust produced by the particle size reduction cannot be separated in the centrifugal separator. This fine dust is the material used to produce the scrubbing solids of this invention. It is recovered from the spent gases by water scrubbing, and it is collected in a settling tank system. A fluid energy mill of the type just described is also known by the trade name "Micronizer." A comprehensive disclosure of fluid energy mills and their method of operation in accordance with the process of the instant invention is found in U.S. Patent 2,032,827.

The following example is presented to illustrate the invention, but it is not to be construed as being in limitation thereof:

EXAMPLE I

In the accompanying flow sheet a process for the production of titanium dioxide pigment by the vapor phase oxidation of titanium tetrachloride is indicated. The reaction of heated titanium tetrachloride and an oxygen-containing gas, such as air, oxygen, or mixtures thereof, has been described in U.S. Patent 2,488,439, and this process is carried out in vapor phase reactor 1. The resulting reaction product stream containing a suspension of pigmentary titanium dioxide in a mixture of chlorine and the unreacted component of the oxygen-containing gas at a temperature between 800° C.–1400° C. is then rapidly cooled to maintain the pigmentary titanium dioxide in the optimum particle size range. This is done by passing the stream directly into and through an externally cooled tubular cooler 2 to quickly reach a desired temperature. Usually, this temperature is between 80° C. and 100° C. A cooler for this use is described in U.S. Patent 2,721,626. After the suspension is cooled, the pigmentary titanium dioxide is separated from the gaseous stream in a bag type separator 3, and then the pigmentary titanium dioxide is passed through a rotary, horizontally positioned kiln-type calciner 4. The purpose of this calcination is to remove occluded chlorine. This step is conducted in the presence of air, and temperatures used range between 500° C.–850° C. The pigment titanium dioxide being discharged from the calciner is cooled in air in a rotating, horizontally inclined cooling tube 5 to a temperature usually not greater than about 200° C. The cooled calcined material is then subjected to the action of fluid energy mill 6 to produce pigment at collector 7. This type of milling process is described in U.S. Patent 2,032,827. In performing the fluid energy milling, the extreme fines (i.e., the dust) escape from the mill with the exit gas. This dust in the gas stream is collected, washed with water in scrubbing system 8, and then filtered, preferably on a continuous filter 9. The water scrubbing system consists of conventional equipment for removing solids from a gas stream by passing it through water sprays, settling the collected pigment in tanks and removing the sedimented pigment slurry to a filter, preferably of the rotary type. A minimum amount of water is used, for economic reasons. The filter cake of the fine dust is dried and heated in a horizontally inclined rotary kiln type drier 10 at a temperature ranging from 500° C.–900° C. This heat treatment forms the scrubbing material into aggregates which are ready for introduction into the cooling conduit without further processing. However, if maximum cooling is desired in the conduit, the scrubbing material is cooled before use. In the flow sheet, cooling bin 11 is used to bring the material to atmospheric temperature.

In a conventional run according to this invention which was producing pigment at the rate of 1300 pounds per hour, titanium dioxide in gaseous suspension is exited from the reactor at the rate of about 40 feet per second at a temperature of about 1150° C. into the cooling conduit. This cooling unit was 1500 ft. long and 12" in diameter. At the entrance of the cooling conduit the processed dust from the fluid energy mill is intermittently introduced into the reaction product stream from the oxidation reactor at a rate sufficient to maintain a temperature of about 90° C. for the stream leaving the cooling conduit. The amount of scrubbing solids used to maintain the 90° C. exit temperature averages about 6% by weight of the pigmentary titanium dioxide being cooled. The processed fluid energy mill dust used has an average particle size of about 30 mesh. This material was recovered from the fluid energy milling operation in the manner described above and it was dried and heated to a temperature of about 750° C. and cooled to room temperature in a cooling bin. Materials with an average particle size within the range of about 100 to 4 mesh may be used in this invention.

Table I presented below gives data which shows that smaller amounts of processed fluid energy mill dust are as effective as prior art abrading solids, such as sand and calcined titanium dioxide. The recalcined titanium dioxide which was used to obtain the above data is material which was taken from the production operation, and it was then recalcined at 850° C.–900° C. to increase its hardness, thus providing for a more effective scrubbing of the conduit wall. This recalcined material is the best of prior art scrubbing solids since it is an effective scrubbing agent which produces a relatively high quality pigment product. The data given in Tables I and II for the titanium dioxide scrubbing materials is compiled from the operating data for a six months' period.

Table I

|  | Processed Fluid Energy Mill Dust Heated to 750° C. | Recalcined (850° C.–900° C.) TiO$_2$ | Sand |
| --- | --- | --- | --- |
| Percent Scrubbing Solids Added (Based on TiO$_2$ in Reaction Product Stream) to Maintain 90° C. Cooler Output | Percent 3–8 | Percent 10–20 | Percent [1] 15–20 |

[1] Subsequent separation of sand required.

Table II sets forth the pigment property values of the finished pigment obtained from the operations of Table I. From Table II it will be seen that processed fluid energy mill dust produced a better pigment.

Table II

|  | Pigment Product Obtained When Using Processed Fluid Energy Mill Dust Heated to 750° C. | Pigment Product Obtained When Using Recalcined (850° C.–900° C.) TiO$^2$ | Pigment Product Obtained When Using Sand |
| --- | --- | --- | --- |
| Gloss | 7¾ | 7¾ | 7 |
| Carbon Black Undertone | 9 | 8½ | 7 |
| Tinting Strength | 194 | 192 | 185 |

*Gloss.*—This test was made by preparing gloss paints of the pigments in question in a standard gloss vehicle containing an alkyd resin. When dry, the panels were compared by gloss-meter to obtain readings of the specular reflection. The scale used is zero to 10, wherein zero represented the poorest panel obtainable, and 10 represents optimum reflection.

*Carbon black undertone.*—This test is indicative of relative particle size and particle size distribution, and it was carried out in the manner described in U.S. Patent 2,488,439, column 10. In that reference, the values used are 10 times those shown herein.

*Tinting strength.*—The values given were obtained from tests described on page 3 of U.S. Patent 2,046,054.

In the cooling process contemplated in this invention, the hot gaseous reaction product stream normally leaves the reactor and enters the cooling conduit at a temperature with the range of 850° C.–1400° C., as indicated by a thermocouple within the reactor. The amount of scrubbing solids added to the pigment stream is dependent on the stream temperature desired as the cooled materials leave the conduit. By controlling the addition of the scrubbing material, it is possible to control the exiting temperature of the reaction product stream. An existing temperature range of from 70° C. to 250° C. is satisfactory and a range of from 90° C. to 120° C. is preferred. The maximum temperature can vary depending upon the ability of the separation equipment (e.g., a bag type filter) to withstand a hot chlorine atmosphere. The amount of solids necessary to maintain the above temperature range will vary from 1% to 10%, based on the weight of the pigmentary titanium dioxide in the stream from the reactor. The lineal velocity of the hot gas-solids stream exited from the reactor usually ranges from 10 to 200 feet per second.

It has been found that higher heating temperatures tend to produce a more abrasive scrubbing agent; and for this reason, drying in the range of from 600° C.–800° C. is preferred. At temperatures below 600° C. there is less abrasiveness, and above 800° C. there is a tendency towards the formation of undesired grit that cannot be completely eliminated by normal milling procedures. However, it has been found that good results have been obtained with materials which are heated to temperatures ranging from 500° C. to 900° C.

If desired, the drying and heating of the dust may be conducted as a multiple step operation. Thus, instead of feeding filter cake directly into a rotary kiln type drier, it may be initially dried on a festoon type drier. In this type of drier the wet filter cake is embedded in a heavy wire cloth, and passed in an essentially static condition through a steam-heated tunnel. Such a drier is used for an initial temperature of 150° C.–200° C. The granular product recovered from this drier is then hardened by raising its temperature in a rotary kiln to within the range of 500° C.–800° C. The particle size range of the scrubbing granules is approximately the same after heating with very little increase in fines as a result of heating to the higher temperature ranges. A typical screen analysis for this two-step drying process is as follows:

| Screen Size | Festoon Dried to 150° C. | Festoon Dried Material Subsequently Rotary Dried to 750° C. |
|---|---|---|
| | Percent | Percent |
| −4+40 | 59 | 58 |
| −40+200 | 24 | 20 |
| −200 | 17 | 22 |

A large tubular cooler, about 12–14″ in diameter and several hundred feet in length, for cooling the reaction product suspension from a continuous vapor phase oxidation reactor producing pigmentary titanium dioxide has been described in U.S. Patent 2,721,626. Such an apparatus may be used in this invention. The shell of the tubular cooler is preferably constructed of nickel, aluminum, or other non-corroding metallic substance. Cooling of the metal shell is done by means of a liquid coolant such as water, or other suitable liquid. The water may be sprayed or flowed over the outside of the tubes to maintain the required inside-to-outside temperature differential. With a constant rate of flow of coolant and a constant flow of the hot gaseous suspension through the inside of the cooler, adequate cooling will be maintained if the inner walls of the cooler are maintained substantially free of compacted and adhered pigmentary titanium dioxide buildup in the manner described in this specification. The amount of scrubbing material required is based on the exit temperature of the stream within the cooler. If this temperature rises, more frequent intermittent additions or larger additions of scrubbing agent are made. Additions may be continuous or intermittent, and they may be made at more than one point in the stream. The latter procedure is desirable in any area where there is a tendency to have more than a normal buildup of deposits.

As is apparent from the preceding portion of this specification, a number of advantages result from this invention. It provides a novel and improved scrubbing material from a by-product dust which separates from the bulk of the pigment being produced. Moreover, this dust can be used in lesser amounts than prior art scrubbing agents. Furthermore, because of the inherent fine particle size of the processed dust, the average particle size distribution of the final pigment is brought nearer the optimum for tinting strength, carbon black undertone, and hiding power. A still further advantage is that the introduction of the processed fluid energy mill dust into the cooling conduit blends this dust with the pigment production stream in such a manner that it can be recovered as part of the finished commercial pigment product.

Since it is obvious that many changes and modifications can be made in the above-described details without departing from the nature and spirit of the invention, it is to be understood that the invention is not to be limited to said details except as set forth in the appended claims.

I claim:

1. A process for cooling the reaction product stream of titanium dioxide and accompanying gases which results from the vapor phase oxidation of $TiCl_4$ to $TiO_2$, said process comprising passing said stream through an externally cooled conduit while removing titanium dioxide adhering to the walls of the conduit by adding to said stream, in an amount of about 1–10% of the weight of $TiO_2$ in the stream, titanium dioxide granules obtained by water-washing, collecting and heating to a temperature within the range of 500° C.–900° C. titanium dioxide dust from a fluid energy mill used for grinding to pigment particle size the $TiO_2$ product produced in a vapor phase oxidation of $TiCl_4$, separating the titanium dioxide exited from the cooling conduit and the exited gaseous products, and recovering cooled titanium dioxide.

2. A process for cooling the reaction product stream of titanium dioxide and accompanying gases which results from the vapor phase oxidation of $TiCl_4$ to $TiO_2$, said process comprising passing said stream through an externally cooled conduit while removing titanium dioxide adhering to the walls of the conduit by adding to said stream, in an amount of about 1–10% of the weight of $TiO_2$ in the stream, titanium dioxide granules obtained by water-washing, collecting and heating to a temperature within the range of 500° C.–900° C. and cooling to atmospheric temperature titanium dioxide dust from a fluid energy mill used for grinding to pigment particle size the $TiO_2$ product produced in a vapor phase oxidation of $TiCl_4$, separating the titanium dioxide exited from the cooling conduit and the exited gaseous products, and recovering cooled titanium dioxide.

3. A process for cooling the reaction product stream of titanium dioxide and accompanying gases which results from the vapor phase oxidation of $TiCl_4$ to $TiO_2$, said process comprising passing said stream through an externally cooled conduit while removing titanium dioxide adhering to the walls of the conduit by adding to said stream 1% to 10% by weight, based on the $TiO_2$ in the stream from the oxidation reactor, of a scrubbing agent consisting of titanium dioxide granules obtained by water-washing, collecting and heating to a temperature within the range of 500° C.–900° C. titanium dioxide dust from a fluid energy mill used for grinding to pigment particle size the $TiO_2$ product produced in a vapor phase oxidation of $TiCl_4$, separating the titanium dioxide exited from the cooling conduit and the exited gaseous products, and recovering cooled titanium dioxide.

4. A process for producing titanium dioxide pigment which comprises reacting vaporous titanium tetrachloride and oxygen-containing gas in a vapor phase oxidation reactor, passing the reaction product stream of titanium dioxide and accompanying gases which results from said reaction through an externally cooled conduit while removing titanium dioxide adhering to the walls of the conduit by adding to said stream, in an amount of about 1–10% of the weight of the $TiO_2$ in the stream, titanium dioxide granules obtained by water-washing, collecting and heating to a temperature within the range of 500° C.–900° C. and cooling to atmospheric temperature titanium dioxide dust from a fluid energy mill used for grinding to pigment particle size the $TiO_2$ product produced in a vapor phase oxidation of $TiCl_4$, separating the titanium dioxide exited from the cooling conduit and the exited gaseous products, calcining the separated titanium dioxide at 500° C.–850° C. until occluded chlorine is removed, cooling the calcined titanium dioxide to at least 200° C., subjecting the cooled calcined titanium dioxide to the action of a fluid energy mill to produce titanium dioxide pigment, recovering the waste dust from the milling operation by water-washing, collecting said recovered waste dust and heating the same to a temperature within the range of 500° C.–900° C. to form granules, cooling the granules thus prepared for return to the cooling conduit as a scrubbing solid.

5. A process for cooling the reaction product stream of titanium dioxide and accompanying gases which results from the vapor phase oxidation of $TiCl_4$ to $TiO_2$, said process comprising passing said stream through an externally cooled conduit in admixture with from 1 to 10%, based on the weight of the $TiO_2$ in the reaction product stream, of added titanium dioxide granules obtained by water-washing, collecting, and heating to a temperature within the range of 600° C.–800° C. titanium dioxide dust from a fluid energy mill used for grinding to pigment particle size the $TiO_2$ product produced in a vapor phase oxidation of $TiCl_4$, separating the titanium dioxide exited from the cooling conduit and the exited gaseous products, and recovering cooled titanium dioxide.

References Cited in the file of this patent

UNITED STATES PATENTS

| | | |
|---|---|---|
| 2,691,571 | Schaumann et al. | Oct. 12, 1954 |
| 2,721,626 | Rick | Oct. 25, 1955 |

OTHER REFERENCES

Perry: "Chemical Engineer's Handbook," 3rd ed., McGraw-Hill Book Co., Inc., N.Y., 1950, page 963, Table 9.